United States Patent
Minich et al.

(10) Patent No.: US 11,729,541 B2
(45) Date of Patent: *Aug. 15, 2023

(54) MULTI-STAGE BODY ENGAGEMENT DETECTION

(71) Applicant: Bose Corporation, Framingham, MA (US)

(72) Inventors: David Minich, Natick, MA (US); Josue Malaver, Millbury, MA (US); Miriam Israelowitz, Brookline, MA (US); Alexia Delhoume, Framingham, MA (US); Michelle Gelberger, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/562,977

(22) Filed: Dec. 27, 2021

(65) Prior Publication Data
US 2022/0124426 A1 Apr. 21, 2022

Related U.S. Application Data

(63) Continuation of application No. 16/835,856, filed on Mar. 31, 2020, now Pat. No. 11,212,607.

(51) Int. Cl.
*H04R 1/10* (2006.01)
*H04W 76/14* (2018.01)

(52) U.S. Cl.
CPC .......... *H04R 1/1041* (2013.01); *H04W 76/14* (2018.02); *H04R 2420/07* (2013.01); *H04R 2460/01* (2013.01)

(58) Field of Classification Search
CPC .............. H04R 1/1041; H04R 2420/07; H04R 2460/01; H04W 76/14
USPC .......................................................... 381/74
See application file for complete search history.

(56) References Cited

U.S. PATENT DOCUMENTS 11,212,607 B2 * 12/2021 Minich ................ H04R 1/1041
2017/0094399 A1 * 3/2017 Chandramohan .... H04R 1/1025

* cited by examiner

Primary Examiner — Paul Kim

(57) ABSTRACT

According to an aspect of the disclosure, an audio device is provided comprising a communications interface configured to be communicatively coupled to an audio source, at least one sensor, and a controller configured to control the audio device to be in a low-power mode, receive, from the sensor(s), information indicative of a presence of a user's body, initiate, via the communications interface responsive to receiving the information, a wireless communication pairing process to establish a wireless communication bond with the audio source prior to determining that the audio device is fully engaged with the user's body, determine, subsequent to initiating the wireless communication pairing process and based on information received from the sensor (s), that the audio device is fully engaged with the user's body, and control, responsive to determining that the audio device is fully engaged with the user's body, the audio device to be in an active mode.

20 Claims, 9 Drawing Sheets

MULTI-STAGE BODY ENGAGEMENT DETECTION

RELATED APPLICATIONS

This application is a continuation of and claims priority to pending U.S. patent application Ser. No. 16/835,856, filed on Mar. 31, 2020, the entire contents of which are incorporated herein by reference.

BACKGROUND

1. Field of the Disclosure

At least one example in accordance with the present disclosure relates generally to detecting use of electronic devices.

2. Discussion of Related Art

Various audio devices are configured to receive signals encoding audio information from an audio source, and output acoustic signals based on the received signals. Wired audio devices may receive the signals encoding the audio information from the audio source via a wired connection. Wireless audio devices may receive the signals encoding the audio information from the audio source via a wireless connection. Wireless audio devices may need to establish a wireless connection with the audio source in a process generally referred to as "pairing" before the signals encoding the audio information may be sent.

SUMMARY

According to at least one aspect of the present disclosure, an audio device is provided comprising a communications interface configured to be communicatively coupled to an audio source, at least one sensor, and a controller coupled to the communications interface and the at least one sensor, the controller being configured to control the audio device to be in a low-power mode, receive, from the at least one sensor, information indicative of a presence of a body of a user, initiate, via the communications interface responsive to receiving the information indicative of the presence of the user, a wireless communication pairing process to establish a wireless communication bond with the audio source prior to determining that the audio device is fully engaged with the body of the user, determine, subsequent to initiating the wireless communication pairing process and based on information received from the at least one sensor, that the audio device is fully engaged with the body of the user, and control, responsive to determining that the audio device is fully engaged with the body of the user, the audio device to be in an active mode.

In some examples, the at least one sensor includes a first sensor configured to provide the information indicative of the presence of the body of the user, and wherein the controller is further configured to receive, from a second sensor of the at least one sensor, movement information indicative of movement of the audio device, and activate, responsive to receiving the movement information indicative of movement of the audio device, the first sensor to provide the information indicative of the presence of the body of the user. In various examples, the first sensor includes at least one infrared sensor. In at least one example, the first sensor includes at least one of an infrared sensor to detect a user's tragus and an infrared sensor to detect a user's concha. In some examples, in determining that the audio device is fully engaged with the body of the user, the controller is further configured to receive, from the at least one sensor, orientation information indicative of an orientation of the audio device, and determine, based on the orientation information, that the audio device is in a valid orientation.

In various examples, in determining that the audio device is in the valid orientation, the controller is configured to determine that a first orientation value indicative of an orientation of the audio device about a pitch axis is within a first range of values, and determine that a second orientation value indicative of an orientation of the audio device about a roll axis is within a second range of values. In at least one example, the controller is further configured to receive, from the at least one sensor subsequent to initiating the wireless communication pairing process, orientation information indicative of an orientation of the audio device, determine, based on the orientation information, that the audio device is not in a valid orientation, determine whether a threshold amount of time has elapsed since receiving the information indicative of the presence of the body of the user, and determine, responsive to determining that the threshold amount of time has elapsed, that the audio device is not fully engaged with the body of the user.

In some examples, the controller is further configured to determine, based on the information indicative of the presence of the user, that the audio device is disengaged from the body of the user, determine whether the audio device has been disengaged from the body of the user for at least a threshold period of time, and control, responsive to determining that the audio device has been disengaged from the body of the user for at least the threshold period of time, the audio device to transition from the active mode to the low-power mode. In various examples, in controlling the audio device to be in the active mode, the controller is further configured to disable or modify at least one compressor in a feedforward signal path executed by the controller, and modify an active noise reduction control scheme executed by the controller to increase active noise reduction by the audio device.

According to an aspect of the disclosure, a method of operating an audio device including a communications interface and at least one sensor is provided, the method comprising controlling the audio device to be in a low-power mode, receiving, from the at least one sensor, information indicative of a presence of a body of a user, initiating, via the communications interface responsive to receiving the information indicative of the presence of the user, a wireless communication pairing process to establish a wireless communication bond with an audio source prior to determining that the audio device is fully engaged with the body of the user, determining, subsequent to initiating the wireless communication pairing process and based on information received from the at least one sensor, whether the audio device is fully engaged with the body of the user, and controlling, responsive to determining that the audio device is fully engaged with the body of the user, the audio device to be in an active mode.

In some examples, the at least one sensor includes a first sensor configured to provide the information indicative of the presence of the body of the user, the method further comprising receiving, from a second sensor of the at least one sensor, movement information indicative of movement of the audio device, and activating, responsive to receiving the movement information indicative of movement of the audio device, the first sensor to provide the information indicative of the presence of the body of the user. In various examples, determining that the audio device is fully engaged with the body of the user includes receiving, from the at least one sensor, orientation information indicative of an orientation of the audio device, and determining, based on the orientation information, that the audio device is in a valid orientation.

In at least one example, determining that the audio device is in the valid orientation includes determining that a first orientation value indicative of an orientation of the audio device about a pitch axis is within a first range of values, and determining that a second orientation value indicative of an orientation of the audio device about a roll axis is within a second range of values. In some examples, determining whether the audio device is fully engaged with the body of the user includes receiving, from the at least one sensor subsequent to initiating the wireless communication pairing process, orientation information indicative of an orientation of the audio device, determining, based on the orientation information, that the audio device is not in a valid orientation, determining whether a threshold amount of time has elapsed since receiving the information indicative of the presence of the body of the user, and determining, responsive to determining that the threshold amount of time has elapsed, that the audio device is not fully engaged with the body of the user. In various examples, controlling the audio device to be in the active mode includes disabling or modifying at least one compressor in a feedforward signal path, and modifying an active noise reduction control scheme to increase active noise reduction by the audio device.

According to an aspect of the disclosure, a non-transitory computer-readable medium storing thereon sequences of computer-executable instructions for operating an audio device including a communications interface and at least one sensor is provided, the sequences of computer-executable instructions including instructions that instruct at least one processor to control the audio device to be in a low-power mode, receive, from the at least one sensor, information indicative of a presence of a body of a user, initiate, via the communications interface responsive to receiving the information indicative of the presence of the user, a wireless communication pairing process to establish a wireless communication bond with the audio source prior to determining that the audio device is fully engaged with the body of the user, determine, subsequent to initiating the wireless communication pairing process and based on information received from the at least one sensor, whether the audio device is fully engaged with the body of the user, and control, responsive to determining that the audio device is fully engaged with the body of the user, the audio device to be in an active mode.

In some examples, the instructions that instruct the at least one processor to determine whether the audio device is fully engaged with the body of the user further instruct the at least one processor to receive, from the at least one sensor, orientation information indicative of an orientation of the audio device, and determine, based on the orientation information, that the audio device is in a valid orientation. In various examples, in instructing the at least one processor to determine whether the audio device is in the valid orientation, the instructions further instruct the at least one processor to determine that a first orientation value indicative of an orientation of the audio device about a pitch axis is within a first range of values, and determine that a second orientation value indicative of an orientation of the audio device about a roll axis is within a second range of values.

In at least one example, in instructing the at least one processor to determine whether the audio device is fully engaged with the body of the user, the instructions further instruct the at least one processor to receive, from the at least one sensor subsequent to initiating the wireless communication pairing process, orientation information indicative of an orientation of the audio device, determine, based on the orientation information, that the audio device is not in a valid orientation, determine whether a threshold amount of time has elapsed since receiving the information indicative of the presence of the body of the user, and determine, responsive to determining that the threshold amount of time has elapsed, that the audio device is not fully engaged with the body of the user. In some examples, in instructing the processor to control the audio device to be in the active mode, the instructions further instruct the at least one processor to disable or modify at least one compressor in a feedforward signal path, and modify an active noise reduction control scheme to increase active noise reduction by the audio device.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
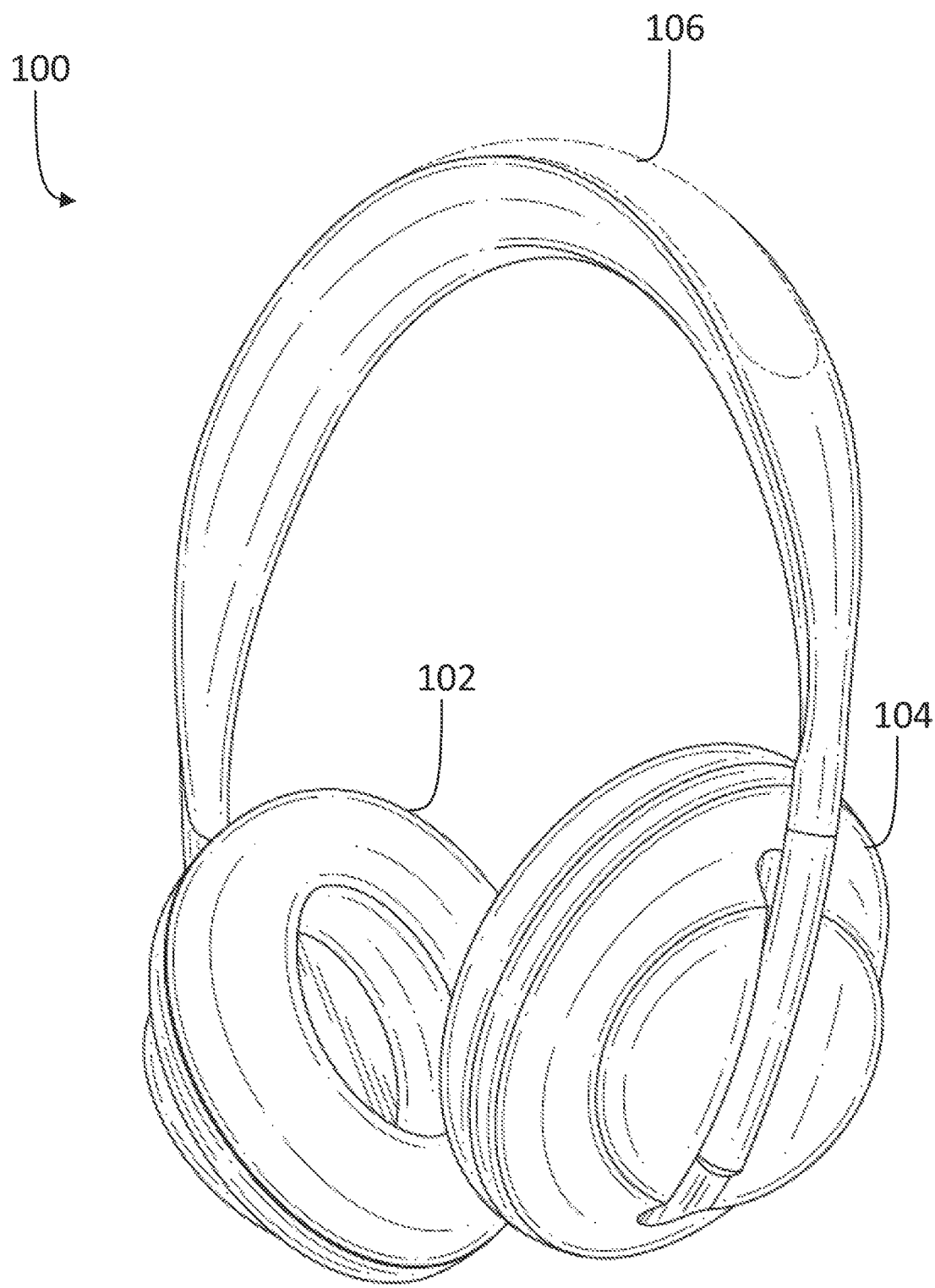
FIG. 1 illustrates a perspective view of headphones according to an example.

As discussed above, wireless audio devices may communicate wirelessly with entities providing audio information (including, for example, smartphones, tablets, laptops, personal computers, and so forth). Accordingly, wireless audio devices may include components for sending and/or receiving audio signals. For example, wireless audio devices may include antennas configured to convert electromagnetic waves propagating through space into electrical currents and/or convert electrical currents into electromagnetic waves propagating through space. Wireless audio devices may also include other components, such as sensors, transducers, energy storage devices, and so forth.

When a user is not using the wireless audio device (for example, when the user is not using the wireless audio device to output acoustic signals), it may be advantageous for the wireless audio device to disable certain device functionality to reduce power consumption. Accordingly, it may be advantageous to provide wireless audio devices having multiple modes of operation. For example, a wireless audio device may have a "sleep," or low-power, mode during which power consumption is minimized or reduced, and an "active," or full-power, mode during which power consumption is not minimized or reduced to the same degree as the sleep mode. The low-power mode may include curtailing and/or disabling certain device functionality or features to reduce power consumption, although other functionality or features may remain active.

Similarly, the active mode may include curtailing and/or disabling certain device functionality or features to reduce power consumption, although on average the wireless audio device may consume more power during the active mode. That is, certain functionality may be beneficial when the wireless audio device is not in use by a user, but may be less beneficial when the wireless audio device is in use by the user. In light of the foregoing, it may be beneficial to detect when the wireless audio device is in use and when the wireless audio device is not in use such that certain device functionality may be disabled or enabled based on whether the wireless audio device is in use.

For example, a first feature includes modifying operation of a feedforward compressor as a part of an active noise reduction (ANR) or active noise cancellation (ANC) system. In various examples, a wireless audio device may include a feedforward signal path having a compressor configured to respond to certain instability conditions that may negatively impact a user's experience. For example, an undesirable coupling between an audio device driver and a feedforward microphone may occur where a user cups a hand around the audio device, which may cause undesirable audible artifacts. The compressor in the feedforward signal path of an ANR or ANC system may detect this coupling and modify a set of filter coefficients in the feedforward signal path to mitigate or eliminate the audible artifacts.

Such undesirable coupling may be particularly common where a user is in the process of engaging the wireless audio device with the user's body (for example, by inserting the audio device into the user's ears and adjusting them to a comfortable orientation) while preparing to use the wireless audio device. Maintaining the compressor in operation while the wireless audio device is not fully engaged with the user's body may therefore advantageously mitigate the effects of the undesirable coupling. However, the coupling is typically not experienced once the audio device is fully engaged with the user's body (for example, after the wireless audio device is inserted into the user's ears and the user has finished adjusting the audio device). Maintaining the compressor in operation after the audio device is fully engaged with the user's body may therefore disadvantageously result in the compressor being activated unnecessarily, which can lower ANR performance. Accordingly, operation of the compressor may be unnecessary once the wireless audio device is fully engaged with the user's body. It may therefore be beneficial to disable or minimize operation of the compressor responsive to detecting that the wireless audio device has been engaged with the user's body.

A second feature includes increasing filtering settings of an ANR or ANC system and enabling an instability detection algorithm. In various examples, the wireless audio device may include an ANR system to detect feedback instability and modify one or more filter settings based on the feedback instability. However, in some examples, the wireless audio device may detect feedback instability where ANR may offer few or no benefits. For example, the ANR function may detect feedback instability where a user blocks a nozzle of the wireless audio device, which may occur where a user is handling the wireless audio device to engage the wireless audio device with the user's body. Accordingly, operation of the ANR function may be unnecessary before the wireless audio device is fully engaged with the user's body. It may therefore be beneficial to disable or minimize operation of the ANR function (for example, by disabling the instability detection algorithm and reducing filtering settings) until the wireless audio device is determined to be engaged with the user's body. More particularly, it may be advantageous to activate an instability algorithm and increase feedback filtering settings only when the wireless audio device is determined to be engaged with the user's body.

A third feature includes maintaining a wireless connection between the wireless audio device and an entity or entities providing audio information that the wireless audio device uses to output acoustic signals. While a user is not using the wireless audio device, it may be beneficial to temporarily suspend a wireless connection between the wireless audio device and the entity or entities providing the audio information. When a user resumes using the wireless audio device, it may be advantageous to re-establish a wireless connection between the wireless audio device and the entity or entities providing the audio information. However, re-establishing the wireless connection, also referred to herein as "pairing," may not be instantaneous.

Certain wireless technology standards, such as the BLUETOOTH™ wireless technology standard, include various procedures that are typically executed prior to wireless signals being exchanged. For example, entities communicating pursuant to a wireless technology standard may need to validate an identity of the other entity to ensure that sensitive information exchanged between the devices is not disadvantageously provided to a malicious user. Pairing processes between two entities may thus not be instantaneous, depending on the requirements of a wireless technology standard adhered to. Because certain wireless technology standards do not allow the exchange of audio information prior to completion of the pairing process, a user may need to wait for the pairing process to complete before the user can freely use the wireless audio device.

Understandably, users may find the delay imposed by pairing processes inconvenient. For example, if a pairing process does not begin until a user fully engages with a wireless audio device or devices, the user may need to wait several seconds before the wireless audio device or devices complete the pairing process and output the desired acoustic signals. Users may perceive such wireless audio devices as "slow" due to this delay period.

Examples provided herein reduce or eliminate a delay between a user donning a wireless audio device and the user being able to freely use the wireless audio device. In some examples, a pairing process is initiated prior to the user fully engaging with the wireless audio device. An example is provided in which a user picks up a wireless audio device in a low-power mode off of a surface, such as a table, on which the user previously placed the wireless audio device. The user dons the wireless audio device by placing the wireless audio device in, on, and/or around the user's ear and adjusts the wireless audio device appropriately until the wireless audio device has fully engaged the user's body (for example, engaged with the user's ear[s] or head).

To reduce the aforementioned delay in one example of this scenario, the wireless audio device includes various sensors to determine, as early as possible, when a user is preparing to use the wireless audio device. For example, the wireless audio device may include one or more movement sensors, position sensors, orientation sensors, touch sensors, and/or infrared (IR) sensors to determine a confidence level that a user is preparing to use the wireless audio device. As a user begins to pick up a wireless audio device, movement and/or position data (for example, accelerometer data) may indicate that the wireless audio device is beginning to move (for example, upwards). The wireless audio device may determine that the wireless audio device being moved (for example, picked up) indicates that the user is preparing to use the wireless audio device. Responsive to determining that the wireless audio device is being picked up, the wireless audio device may awaken one or more IR sensors from a low-power state, to begin sampling data at a desired (for example, normal) frequency. In other examples, the one or more IR sensors may already be sampling data at a desired frequency regardless of whether or not the wireless audio device is being picked up, and no particular action may be taken responsive to movement of the wireless audio device.

As the user begins to engage the wireless audio device in, on, or around the user's ear (for example, by inserting the wireless audio device into the user's ear canal, where the wireless audio device is an in-ear device), the IR sensors may detect features of the user's ear (including, for example, the concha and/or tragus). The wireless audio device may determine that the wireless audio device detecting certain features of the user's body corresponds to a "low confidence" level that the user is preparing to use the wireless audio device. Responsive to entering the low confidence level, the wireless audio device may initiate a pairing process as discussed above.

Responsive to determining that the IR sensors have detected respective features of the user's ear, the wireless audio device may determine whether the wireless audio device is in a valid orientation (for example, an orientation in which the wireless audio device is expected to be while being worn and used by a user). For example, the wireless audio device may include one or more accelerometers or other sensors configured to determine an orientation of the wireless audio device and may determine whether the orientation is a valid orientation. The wireless audio device may thus be determined to be in use responsive to the IR sensors substantially simultaneously detecting respective features of the user's body and subsequently detecting a valid orientation of the wireless audio device.

By the time the user has finished adjusting the wireless audio device to a comfortable position in, on, or around the user's ear, corresponding to being fully engaged with the body of the user, the pairing process may be complete or nearly complete. Accordingly, examples disclosed herein enhance a user's experience by minimizing or reducing a delay between the user donning a wireless audio device and the user being able to freely use the wireless audio device, while still minimizing power consumption when the wireless audio device is not in use.

Accordingly, detecting that the wireless audio device is in use or that the wireless audio device is not in use may be beneficial in determining whether to activate or deactivate certain functionality of the wireless audio device. Deactivating functionality when such features are not as beneficial may advantageously decrease power consumption of the wireless audio device and thereby increase a battery life of the wireless audio device.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements, or acts of the systems and methods herein referred to in the singular may also embrace examples including a plurality, and any references in plural to any example, component, element or act herein may also embrace examples including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

A headphone or earphone may refer to a device that typically fits around, on, in, or near an ear and that radiates acoustic energy into or towards the ear canal. Headphones and earphones are sometimes referred to as earpieces, headsets, earbuds, or sport headphones, and can be wired or wireless. Certain wireless headphones play audio to a user based on information received from an audio source. An audio source may include a computing device (for example, a laptop computer, desktop computer, tablet, smartphone, or other electronic device) configured to communicate wireless signals encoding audio information to the wireless headphones. While headphones are described in various examples within this document, the technology described in this document is also applicable to other wearable audio devices. The term "wearable audio device," as used in this document, is intended to mean a device that fits around, on, in, or near an ear (including open-ear audio devices worn on the head or shoulders of a user) and that radiates acoustic energy into or towards the ear. Wearable audio devices include but are not limited to headphones, earphones, earpieces, headsets, earbuds, sport headphones, and audio eyeglasses, and can be wired or wireless. In some examples, a wearable audio device may be an open-ear device that includes an acoustic driver to radiate acoustic energy towards the ear while leaving the ear open to its environment and surroundings. A wireless wearable audio device may be referred to herein as a "wireless audio device."

A headphone may include an electro-acoustic transducer driver to transduce audio signals into acoustic energy. The acoustic driver may be housed in an earcup, earbud, or other housing. Some of the figures and descriptions following show a single headphone device or component, such as an antenna. A headphone may be a single stand-alone unit or one of a pair of headphones (each including at least one acoustic driver), one for each ear. A headphone may be connected mechanically and/or electrically to another headphone, for example by a headband and/or by leads that conduct audio signals to an acoustic driver in the headphone. A headphone may include components for wirelessly receiving audio signals or other wireless signals. A headphone may include components of an active noise reduction (ANR) system. Headphones may also include other components, such as microphones, accelerometers, gyroscopes, infrared sensors, compasses, GPS components, and so forth. A headphone may also be an open-ear device that includes an electro-acoustic transducer to radiate acoustic energy towards the ear canal while leaving the ear open to its environment and surroundings.

Example wireless audio devices will be described with respect to FIGS. 1-3B. However, it is to be appreciated that FIGS. 1-3B illustrate only some examples of audio devices. As discussed above, other audio devices are within the scope of the disclosure. FIG. 1 illustrates a perspective view of headphones 100 according to an example. The headphones 100 include a first housing 102, a second housing 104, and a connector 106. In one example, the first housing 102 may be configured to be placed over one of a user's ears, and the second housing 104 may be configured to be placed over another of the user's ears. The first housing 102 and the second housing 104 may each respectively include an acoustic driver configured to transmit acoustic energy to the user. The connector 106 may provide an electrical and/or mechanical connection between the first housing 102 and the second housing 104 and facilitate coupling of the headphones 100 to the user's ears and/or head.

Figure 2:
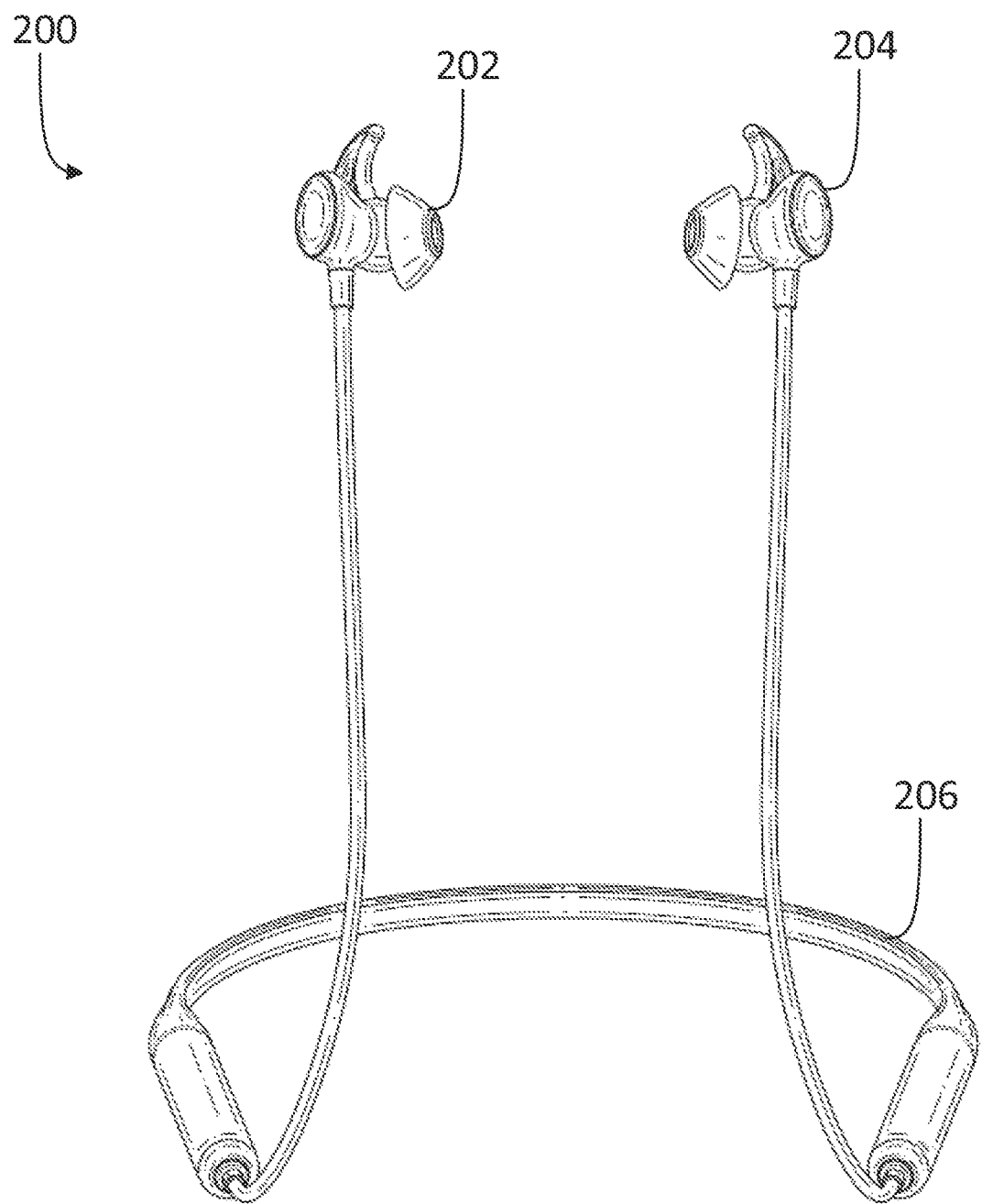
FIG. 2 illustrates a perspective view of headphones according to another example.

FIG. 2 illustrates a perspective view of headphones 200 according to another example. The headphones 200 include a first housing 202, a second housing 204, and a connector 206. In one example, the first housing 202 may be configured to be inserted into one of a user's ear canals or pinne, and the second housing 104 may be configured to be inserted into another of the user's ear canals or pinne. The first housing 202 and the second housing 204 may each respectively include an acoustic driver configured to provide acoustic energy to the user. The connector 206 may provide an electrical and/or mechanical connection between the first housing 202 and the second housing 204. Although the connector 206 may be implemented in a wired configuration, the headphones 200 may be referred to as a wireless audio device in certain examples, such as where the headphones maintain a wireless connection with an audio source.

Figure 3B:
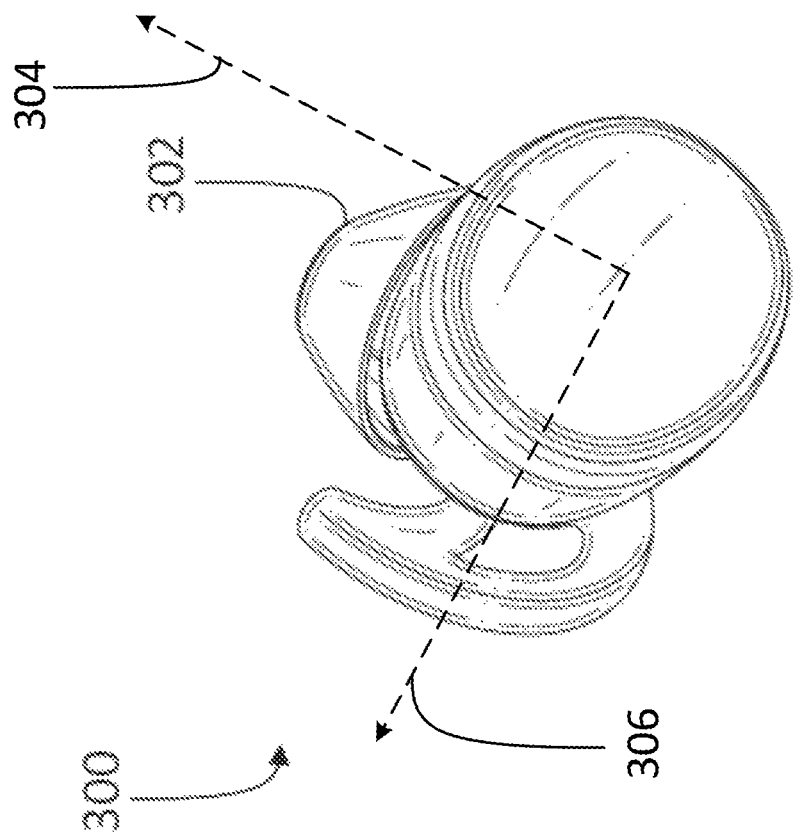
FIG. 3B illustrates another perspective view of the earpiece according to an example.
Figure 3A:
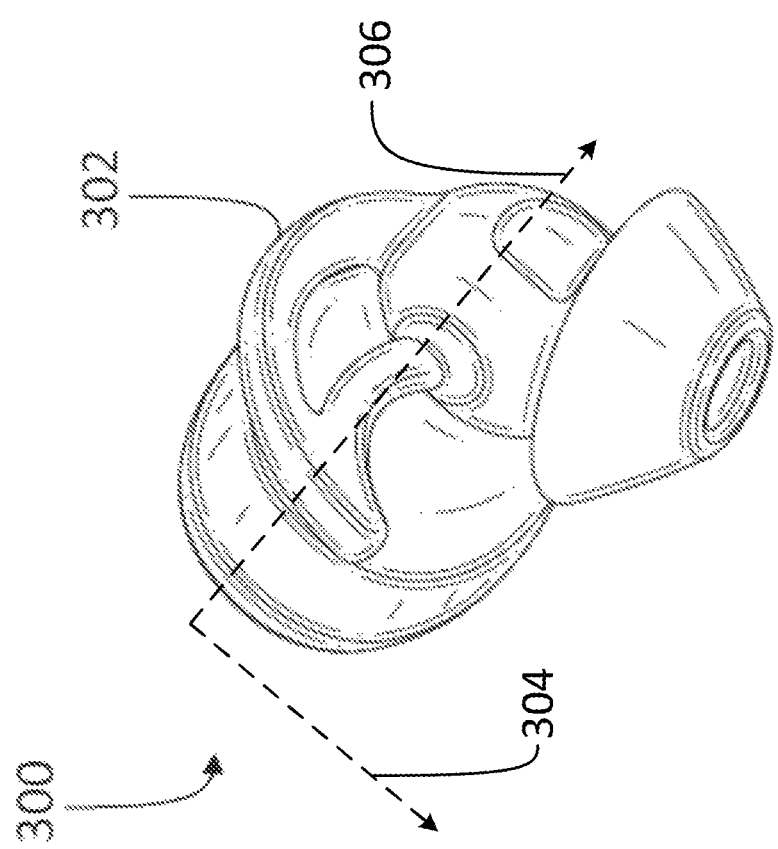
FIG. 3A illustrates a perspective view of an earpiece according to an example.

FIG. 3A illustrates a perspective view of an earpiece 300 according to another example. FIG. 3B illustrates another perspective view of the earpiece 300 according to an example. In this example, the earpiece 300 of FIGS. 3A and 3B is a part of a set of truly wireless earbuds or truly wireless in-ear (TWIE) buds, such as the SoundSport® Free wireless headphones sold by Bose Corporation. The earpiece 300 includes a housing 302. In one example, the housing 302 may be configured to be inserted into one of a user's ear canals or pinne. The housing 302 may include an acoustic driver configured to provide acoustic energy to the user. The earpiece 300 may be implemented in conjunction with another, similar, headphone configured to be inserted into another of the user's ear canals or pinne. In some examples, the earpiece 300 and the similar headphone may communicate wirelessly with one another. FIGS. 3A and 3B further include a pitch axis 304 and a roll axis 306 about which an orientation of the earpiece 300 may be described.

Still other wireless audio devices are contemplated by the disclosure. For example, and as discussed above, wireless audio devices may include, for example, headphones, earphones, earpieces, headsets, earbuds, sport headphones, audio eyeglasses, or other devices configured to output acoustic signals.

Figure 4:
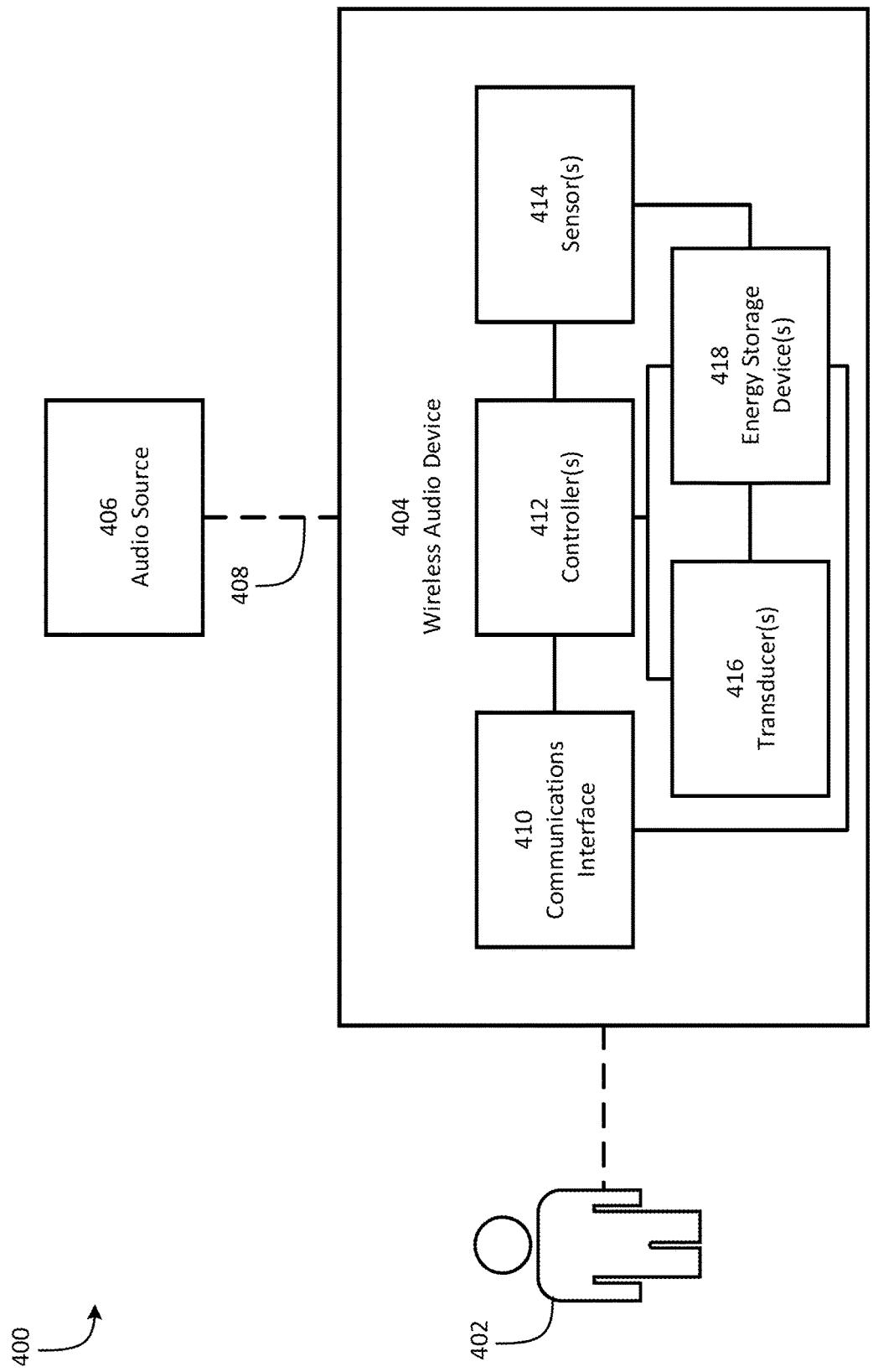
FIG. 4 illustrates a schematic diagram of a wireless audio system according to an example.

FIG. 4 illustrates a block diagram of a wireless audio system 400 according to an example. The wireless audio system 400 includes a user 402, a wireless audio device 404, and an audio source 406. The wireless audio device 404 is communicatively coupled to the audio source 406 via a communication medium 408. The wireless audio device 404 includes a communications interface 410, a controller(s) 412, one or more sensors 414, one or more transducers 416, and one or more energy storage devices 418.

The wireless audio device 404 may be or include one or more of the example wireless audio devices discussed above, including but not limited to the examples provided in FIGS. 1-3B. In some examples, the wireless audio device 404 is one of a pair of devices. For example, the wireless audio device 404 may be an earpiece (for example, the earpiece 300) capable of being used in combination with a second, similar earpiece. In still other examples, the wireless audio device 404 may be or include wireless audio devices other than those illustrated in FIGS. 1-3B, such as audio eyeglasses or ear hooks that rest on the top of a user's ears.

The audio source 406 may include any source of audio media content. For example, the audio source 406 may be a personal computer, tablet computer, cellular phone (for example, a smartphone), smart watch, smart television, vehicle media system, or any other source of audio media content. The audio media content may include, for example, music, podcasts, telephone call audio, or any other audio media content. As discussed in greater detail below, the audio source 406 may provide signals indicative of the audio media content to the wireless audio device 404 via the communication medium 408.

The communication medium 408 may include any medium through which signals encoding audio media content may be provided. For example, the communication medium 408 may include electromagnetic signals. Audio media content may be encoded in one or more electromagnetic signals by the audio source 406 and output by the audio source 406 (for example, via an antenna) to the wireless audio device 404. Similarly, the wireless audio device 404 may be configured to provide one or more signals via the communication medium 408 to the audio source 406 (for example, signals indicative of a "play or pause music" command, signals indicative of an "answer phone call" command, and so forth).

The communications interface 410 may include any interface through which communications may be exchanged with external devices. For example, the communications interface 410 may include one or more antennas configured to convert electromagnetic radiation into an electrical current, and to convert an electrical current into electromagnetic radiation.

The controller(s) 412 is configured to control operation of the wireless audio device 404, as discussed in greater detail below. The controller(s) 412 may be configured to implement one or more feedback and/or feedforward control schemes and may include one or more components to implement the control scheme(s), such as one or more compressors. For example, the controller(s) 412 may be configured to implement one or more ANR control schemes to control operation of the transducer(s) 416.

The sensor(s) 414 may include one or multiple types of sensors. For example, the sensor(s) 414 may include capacitive touch sensors, inertial measurement units (IMUs), accelerometers, IR sensors, strain sensors, thermal sensors, magnetic field sensors, gyroscopes, microphones, or any other types of sensors. The sensor(s) 414 may send signals indicative of sensed parameters to the controller(s) 412, responsive to which the controller(s) 412 may modify operation of the wireless audio device 404.

For example, the sensor(s) 414 may include one or more accelerometers, gyroscopes, magnetometers, IMUs (which may include one or more accelerometers, gyroscopes, and/or magnetometers), and so forth, configured to detect, in part, a position, orientation, and/or movement of the wireless audio device 404. The sensor(s) 414 may alternately or additionally include one or more IR sensors configured to detect, in part, electromagnetic radiation reflecting off of a user's body. For example, the sensor(s) 414 may include a first IR sensor positioned to detect IR electromagnetic radiation reflecting off of a user's concha, and/or a second IR sensor positioned to detect IR electromagnetic radiation reflecting off of a user's tragus. The sensor(s) 414 may alternately or additionally include one or more capacitive sensors configured to detect, in part, a user's body (for example, a user's finger or hand) proximate to, or in contact with, the one or more capacitive sensors. The sensor(s) 414 may alternately or additionally include one or more microphones configured to detect, in part, audio feedback signals (for example, audio signals indicative of an ambient environment of the wireless audio device 404) to implement an ANR control scheme.

The transducer(s) 416 are configured to receive audio signals and output, based on the audio signals, acoustic signals. For example, the transducer(s) 416 may include one or more speakers. The energy storage device(s) 418 are configured to store energy (for example, electrical energy) and provide the stored energy to some or all of the components of the wireless audio device 404 to power the components of the wireless audio device 404. For example, the energy storage device(s) 418 may include one or more batteries.

Figure 5:
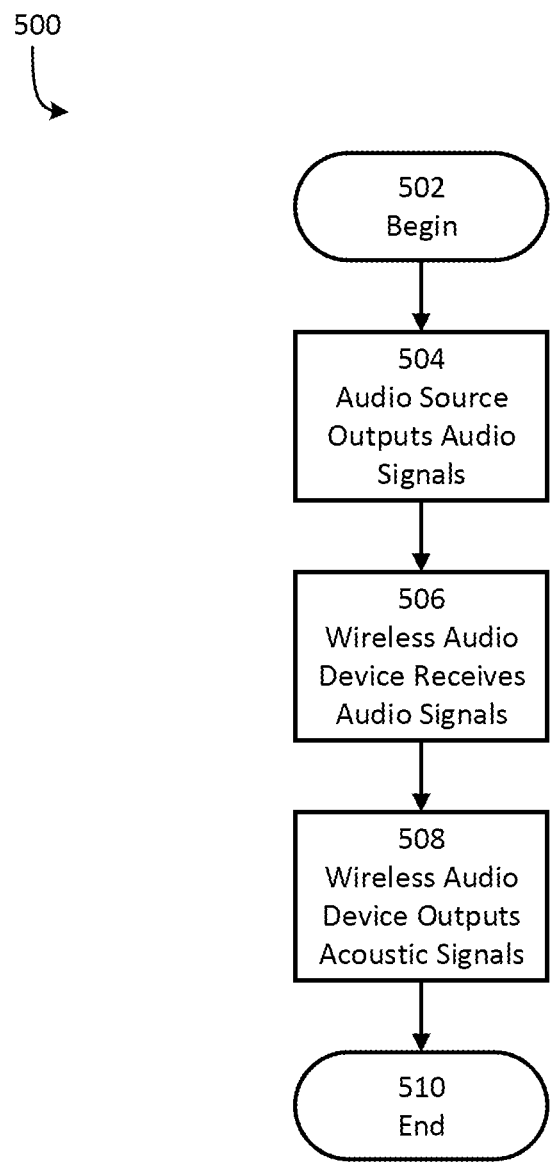
FIG. 5 illustrates a process of operating the wireless audio system according to an example.

FIG. 5 illustrates a process 500 of operation in the wireless audio system 400 according to an example. Note that although process 500 is described in the context of a wireless audio system (specifically, system 400), the present disclosure is not intended to be limited to wireless audio systems unless explicitly state otherwise. Thus, at least some of the systems and methods described herein apply to wired configurations, as well (for example, where the audio device is required to be, or can optionally be, wired to an audio data source, such as wired to a smartphone or tablet computer).

At act 502, the process 500 begins.

At act 504, audio signals are output by the audio source 406. The audio signals may be output by the audio source 406 responsive to the user 402 selecting audio media content via the audio source 406. For example, the user 402 may select music for playback via the audio source 406. In another example, the audio signals may be output by the audio source 406 responsive to another condition, such as the audio source 406 receiving a phone call and outputting audio signals indicative of a ring tone. The audio signals may be output by the audio source 406 to the wireless audio device 404 via the communication medium 408. For example, the audio source 406 may include one or more antennas configured to output audio signals encoded in electromagnetic signals.

At act 506, the audio signals are received by the wireless audio device 404 via the communications interface 410. For example, the communications interface 410 may include one or more antennas configured to convert electromagnetic signals into an electrical current indicative of the audio media content.

At act 508, acoustic signals indicative of the received audio signals are output by the wireless audio device 404 via the transducer(s) 416. As discussed above, the transducer(s) 416 may include one or more speakers configured to output acoustic signals.

At act 510, the process 500 ends.

The process 500 indicates one example of operation of the wireless audio system 400 where the wireless audio device 404 is in active use (that is, where the wireless audio device 404 is actively receiving audio signals from the audio source 406 and outputting acoustic signals in response thereto). At a subsequent point in time, the wireless audio device 404 may no longer be in active use (that is, where the wireless audio device 404 is not receiving audio signals from the audio source 406 and is not outputting acoustic signals). For example, the user 402 may have been using the wireless audio device 404 to listen to music, but has since paused the music and disengaged the wireless audio device 404 from the body of the user 402, such as by taking the wireless audio device 404 out of or off of the head of the user 402 and placing the wireless audio device 404 on a table.

It may be beneficial to disable or minimize operation of certain functions of the wireless audio device 404 when the wireless audio device 404 is not in active use, such as functions that actively consume power but are primarily beneficial only when the wireless audio device 404 is in active use. That is, disabling or minimizing operation of certain functions may minimize an amount of power consumption by the wireless audio device 404 (and thus extend a battery life of the wireless audio device 404) without significantly adversely impacting operation of the wireless audio device 404, at least because the disabled or minimized functions provide little or no benefit where the wireless audio device 404 is not in active use.

Examples of functions that may be disabled or minimized are provided for purposes of illustration. However, alternate or additional functions may be within the scope of the disclosure. As discussed above, a first function includes modifying operation of a compressor as part of an ANR or ANC system based on a state of engagement between a device and a user's body. A second function includes modifying filtering behavior and instability detection functionality of the ANR or ANC system based on a state of engagement between a device and a user's body. A third function includes maintaining, via the communications interface 410, an active communication bond with the audio source 406 based on a state of engagement between a device and a user's body. Certain wireless technology standards (for example, a BLUETOOTH™ wireless technology standard) governing communication via wireless media, such as examples of the communication medium 408, mandate that a pairing process be executed prior to further information being exchanged via the wireless media. For example, the pairing process may be executed prior to execution of the process 500.

The pairing process may include, for example, an identity authentication process. The audio source 406 may provide sensitive information (for example, personal information of the user 402) via the communications medium 408. It may therefore be beneficial for the audio source 406 to authenticate an identity of the wireless audio device 404 during the pairing process prior to the audio source 406 and the wireless audio device 404 exchanging information.

Once the pairing process is complete and a bond is established between the devices 404, 406, the devices 404, 406 may continuously or periodically communicate with one another to maintain the bond without requiring the pairing process to be re-executed. However, maintaining the bond between the devices 404, 406 may cause the wireless audio device 404 to consume power stored by the energy storage device(s) 418. It may therefore be beneficial to disable the bond between the devices 404, 406 after a period of inactivity (that is, the wireless audio device 404 not being used by the user 402) has elapsed. In one non-limiting example, the bond may be disabled after ten minutes of inactivity, after which the pairing process must be re-executed. Accordingly, it may be beneficial to re-initiate the pairing process as soon as a user is determined to be preparing to use the wireless audio device 404 after a period of inactivity.

In one example, the wireless audio device 404 is configured to determine, based at least in part on information determined by the sensor(s) 414, that the user 402 is preparing to use the wireless audio device 404 again after the period of inactivity. For example, and as discussed in greater detail below, the wireless audio device 404 may detect that the user 402 is re-engaging the wireless audio device 404 with the body of the user 402, such as by inserting or attaching the wireless audio device 404 into, around, or near the ear of the user 402. Responsive to this determination, the wireless audio device 404 may re-initiate the pairing process with the audio source 406.

The user 402 may find it ideal for the pairing process to be complete by the time the user 402 has finished adjusting the engagement of the wireless audio device 404 with the body of the user 402. As used herein, an audio device is "fully engaged" with a body of a user where the audio device is seated in, on, or proximate to the user's ear in a position and/or orientation that the audio device is meant to be comfortably used in, after the user has finished adjusting the audio device. Accordingly, it may be beneficial for the wireless audio device 404 to begin the pairing process as soon as the user 402 is preparing to use the wireless audio device 404, rather than after the wireless audio device 404 is fully engaged with the body of the user 402. However, it may also be beneficial for the wireless audio device 404 to minimize "false positives" (that is, situations in which the wireless audio device 404 incorrectly determines that the user is preparing to use the wireless audio device 404) so as to minimize power consumption. It may therefore be desirable for the wireless audio device 404 to employ a process of determining when to initiate a pairing process that maximizes a user's experience and minimizes power consumption.

Figure 6:
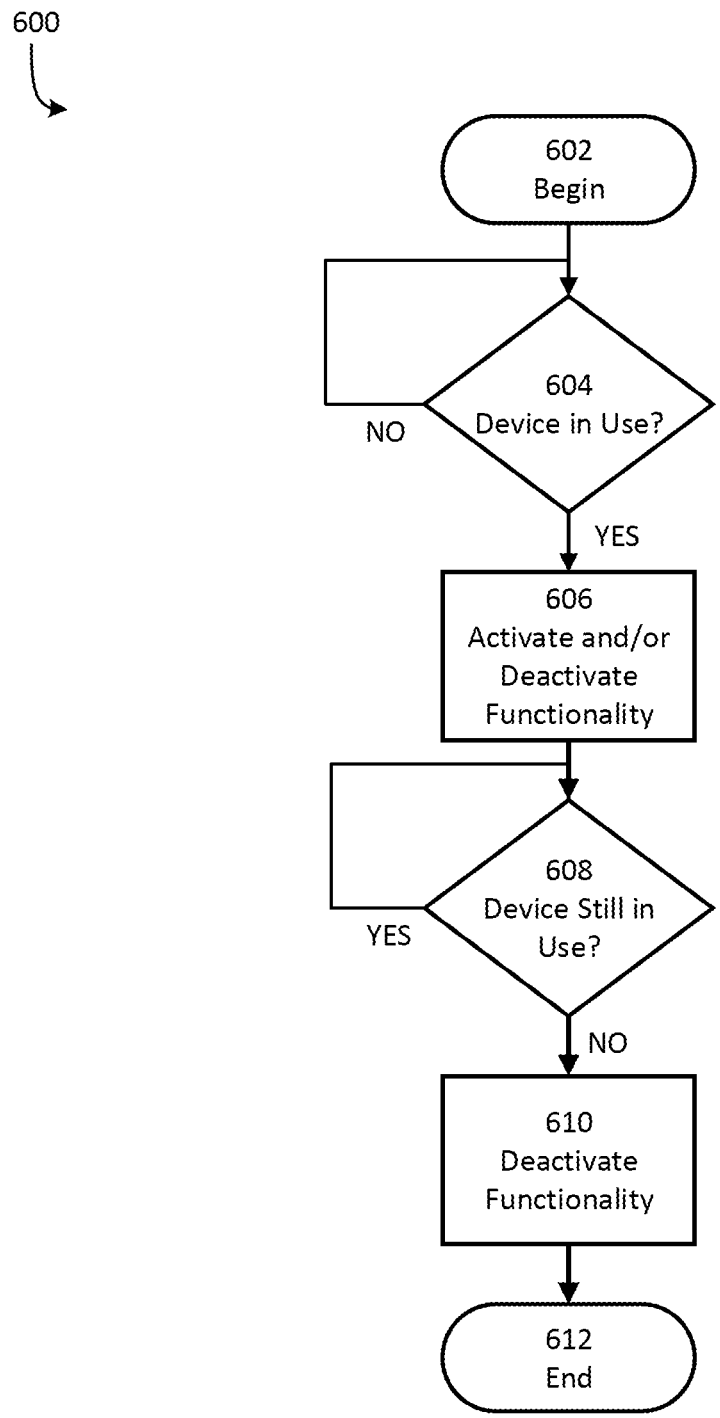
FIG. 6 illustrates a process of operating a wireless audio device according to an example.

FIG. 6 illustrates a process 600 of operating a wireless audio device according to an example. For example, the process 600 may be executed in connection with the wireless audio device 404. The process 600 may initially be executed while the wireless audio device 404 is not in use, during which certain functionality is disabled or suspended. For example, a wireless bond with the audio source 406 may be disabled, and one or more of the sensor(s) 414 may be in an off or low-power state. Conversely, other features or functionality may be enabled while the wireless audio device 404 is not in use, such as the feedforward compressors.

At act 602, the process 600 begins.

Figure 7:
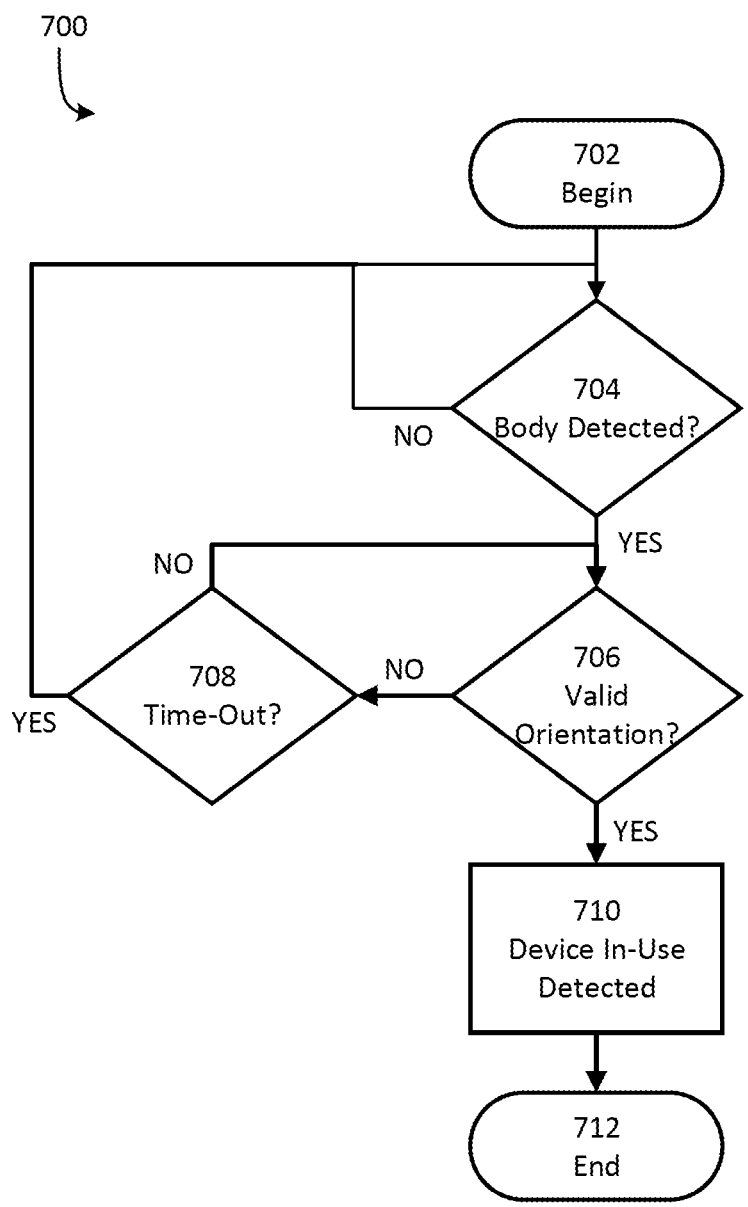
FIG. 7 illustrates a process of determining whether the wireless audio device is in use according to an example.

At act 604, a determination is made by the wireless audio device 404 as to whether the wireless audio device 404 is in use. For example, the wireless audio device 404 may be in use where the user 402 is using the wireless audio device 404, such as by engaging the wireless audio device 404 with a head of the user 402 and utilizing the wireless audio device 404 to output acoustic signals based on information received from the audio source 406. An example of act 604 is discussed below with respect to FIG. 7. If the wireless audio device 404 is not in use (604 NO), then act 604 is repeatedly re-executed until a determination is made that the wireless audio device 404 is in use. If the wireless audio device 404 is in use (604 YES), then the process 600 continues to act 606.

At act 606, functionality of the wireless audio device 404 is activated and/or deactivated. The wireless audio device 404 enters an active mode of operation and activates or deactivates device functionality as dictated by the active mode of operation. More particularly, the wireless audio device 404 may activate functionality that is particularly beneficial while the wireless audio device 404 is in use by the user 402, and deactivate functionality that is of little benefit while the wireless audio device 404 is in use by the user 402. For example, at act 606 the wireless audio device 404 may re-establish a wireless connection with the audio source 406, activate an instability detection algorithm, increase ANR filtering settings, and/or deactivate one or more feedforward compressors. In various examples, one or more optional, user-configured actions may be executed at act 606. For example, an optional action may include commanding the audio source 406 to provide audio information to the wireless audio device 404, such as by commanding the audio source 406 to play music or to accept a telephone call. In another example, the user 402 may control the wireless audio device 404 such that no optional, user-configurable actions are executed at act 606.

Figure 8:
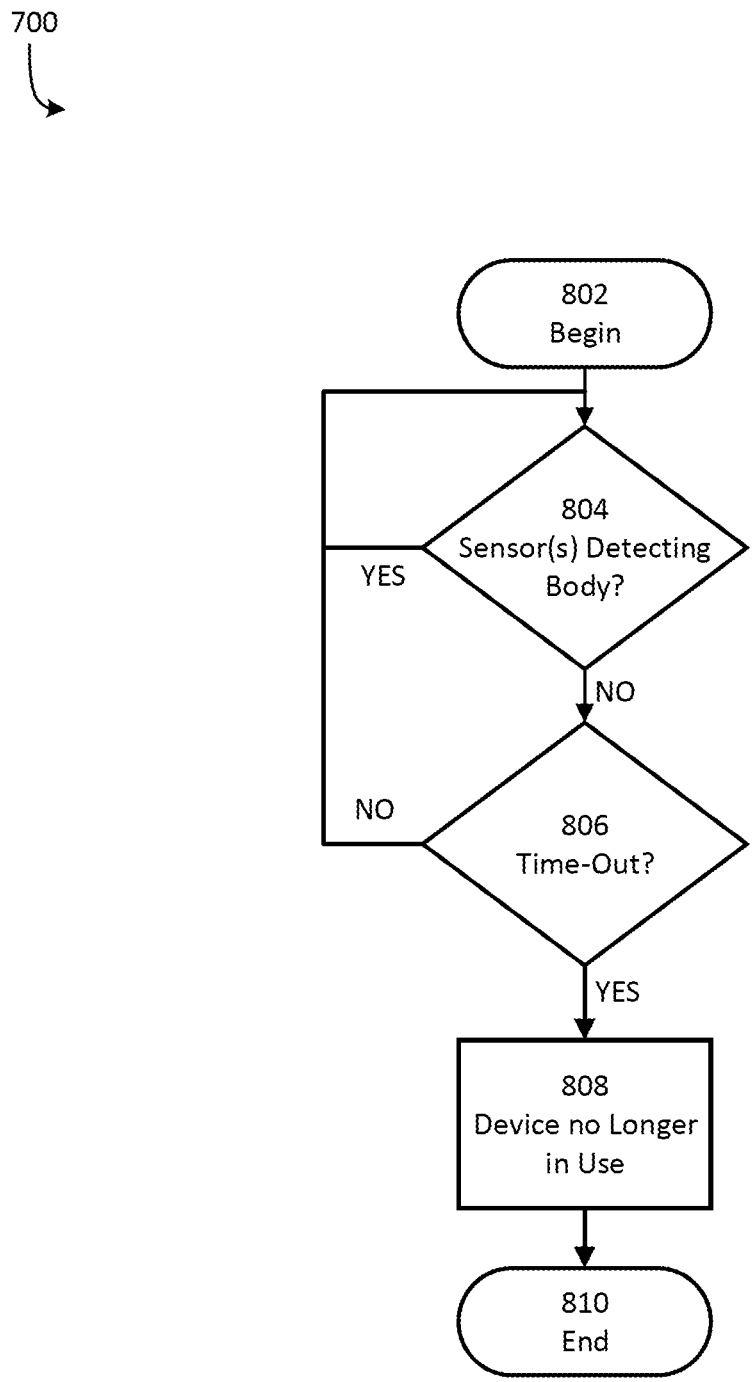
FIG. 8 illustrates a process of determining whether the wireless audio device is still in use according to an example.

At act 608, a determination is made as to whether the wireless audio device 404 is still in use. An example of act 608 is discussed below with respect to FIG. 8. If a determination is made that the wireless audio device 404 is still in use (608 YES), then act 608 is repeatedly executed until a determination is made that the wireless audio device 404 is no longer in use. If a determination is made that the wireless audio device 404 is not still in use (608 NO), then the process 600 continues to act 610. In some examples, a delay period is introduced between acts 608 and 610 such that the wireless audio device 404 must not be in use for a threshold period of time (for example, ten minutes) before the process 600 continues to act 610.

At act 610, functionality of the wireless audio device 404 is deactivated and/or activated. The wireless audio device 404 enters the sleep or low-power mode and deactivates or activates functionality as dictated by the sleep or low-power mode. For example, the wireless audio device 404 may activate functionality that is particularly beneficial while the wireless audio device 404 is not in use by the user 402, and deactivate functionality that is of little benefit while the wireless audio device 404 is not in use by the user 402. For example, the wireless audio device 404 may deactivate functionality that was activated at act 606, and activate functionality that was deactivated at act 606. Act 606 may include de-establishing a wireless connection with the audio source 406, deactivating an instability detection algorithm, decreasing ANR filtering settings, and/or activating one or more feedforward compressors. In various examples, one or more optional, user-configured actions may be executed at act 610. For example, an optional action may include commanding the audio source 406 to provide audio information to the wireless audio device 404, such as by commanding the audio source 406 to play music or to accept a telephone call. In another example, the user 402 may control the wireless audio device 404 such that no optional, user-configurable actions are executed at act 610.

At act 612, the process 600 ends.

As discussed above, FIG. 7 illustrates a process 700 of determining whether the wireless audio device 404 is still in use. For example, the process 700 may be an example of act 604. The process 700 may be executed by the wireless audio device 404.

At act 702, the process 700 begins.

At act 704, a determination is made as to whether a body of the user 402 has been detected. For example, the wireless audio device 404 may determine if parts of the user's ear or head have been detected, which may indicate that the user is in the process of donning the wireless audio device 404. The determination may be made by the controller(s) 412 based at least in part on information received from the sensor(s) 414.

For example, where the sensor(s) 414 include a concha IR sensor and a tragus IR sensor, the controller(s) 412 may determine, based on information received from the concha IR sensor and the tragus IR sensor, whether the information received from the concha IR sensor and the tragus IR sensor indicates that the wireless audio device 404 is proximate to the user's concha and tragus in a manner consistent with the wireless audio device 404 being in use by the user 402. In some examples, a user's body is not determined to be detected unless both the user's concha and tragus are detected approximately simultaneously. In other examples, a user's body may be determined to be detected where either the user's concha and tragus are detected, including examples in which only one of the concha or tragus sensor is implemented and examples in which both the concha and tragus sensors are implemented. In various examples, the concha IR sensor and the tragus IR sensor must detect a respective body part of the user 402 for at least a threshold period of time (for example, 500 ms) for a determination to be made that the body of the user 402 has been detected.

In other examples, the sensor(s) 414 may include one or more sensors to determine the presence or absence of other parts of the user's body, such as other parts of a user's ear, a user's head, or other parts of the user's body. If the wireless audio device 404 determines, based on information received from the sensor(s) 414, that a user's body has not been detected (704 NO), then the process 700 returns to act 704. Act 704 may be repeatedly executed until a user's body has been detected (704 YES), at which point the process 700 continues to act 706.

At act 706, a determination is made as to whether the wireless audio device 404 is in a valid orientation. A valid orientation refers to an orientation that the wireless audio device 404 is expected to be in during normal use by the user 402, and may correspond to a certain range of orientation values received from one of more orientation sensors (for example, accelerometers) of the sensor(s) 414. The controller(s) 412 may receive the orientation values from the sensor(s) 414 and determine, based on the orientation values, whether the orientation values are within a specified range of values.

For example, the orientation values may include a pitch orientation value and a roll orientation value defined relative to the respective axes. As illustrated in FIGS. 3A and 3B, for example, an orientation of the earpiece 300 may be defined relative to the pitch axis 304 and/or the roll axis 306. Where the wireless audio device 404 includes the earpiece 300, in some examples a first orientation value may provide an indication of an orientation of the wireless audio device 404 relative to the pitch axis 304 and a second orientation value may provide an indication of an orientation of the wireless audio device 404 relative to the roll axis 306. The controller(s) 412 may thereafter determine whether the first orientation value is within a first specified range of values and whether the second orientation value is within a second specified range of values to ultimately determine whether the wireless audio device 404 is in a valid orientation. The first and second specified range of values may be provided to the wireless audio device 404 (for example, by a designer of the wireless audio device 404) and may be user-configurable.

If the wireless audio device 404 is not in a valid orientation (706 NO), then the process 700 continues to act 708. At act 708, a determination is made as to whether a time-out condition has been met. The time-out condition may be met where a threshold amount of time has elapsed since the body of the user 402 was detected at act 704. The threshold amount of time may be long enough to enable a user to finish adjusting an orientation of the wireless audio device 404 after initially donning the wireless audio device 404 (for example, 1500 ms). If the time-out condition has been met (708 YES), then the process 700 returns to act 704. For example, it may be assumed that the determination that a user's body has been detected (704 YES) was a false positive based on the wireless audio device 404 not being in a valid orientation (706 NO) for the threshold period of time (708 YES). Otherwise, if the time-out condition has not been met (708 NO), then the process 700 returns to act 706. Act 706 is repeated and, if a determination is made that the wireless audio device 404 is in a valid orientation (706 YES), then the process 700 continues to act 710.

At act 710, a determination is made that the wireless audio device 404 is in use by the user 402. The wireless audio device 404 is therefore determined to be in an active mode of operation, responsive to which certain device functionality may be enabled or disabled, as discussed above with respect to act 606. As discussed above, the determination is made based on the wireless audio device 404 detecting respective portions of a body of the user 402, such as a concha and tragus of the user 402, and subsequently detecting a valid orientation of the wireless audio device 404 within a threshold period of time.

At act 712, the process 700 ends.

Modifications to the process 700 may be provided in alternate examples. In some examples, certain functionality may be activated or deactivated subsequent to detecting a body of the user 402 (704 YES) but prior to determining whether the wireless audio device 404 is fully engaged with a body of the user 402 as evidenced by the wireless audio device 404 being in a valid orientation at act 706. For example, responsive to detecting the body of the user 402 at act 704 (704 YES), the wireless audio device 404 may initiate a pairing process with the audio source 406 and/or may initiate other functionality. If the wireless audio device 404 is subsequently determined to be fully engaged with the body of the user 402 as evidence by the wireless audio device 404 being in a valid orientation at act 706 (706 YES), then the wireless audio device 404 may enter an active mode of operation. In other examples, the wireless audio device 404 may not initiate the pairing process until the body of the user 402 has been detected (704 YES) and a valid orientation has been detected (706 YES). For example, this may be the case where act 604 includes the process 700 and act 606 includes initiating the pairing process.

As discussed above, FIG. 8 illustrates a process 800 of determining whether the wireless audio device 404 is still in use. The process 800 may be an example of act 608. The process 800 may be executed by the wireless audio device 404.

At act 802, the process 800 begins.

At act 804, a determination is made as to whether the sensor(s) 414 are still detecting a body of the user 402. For example, the sensor(s) 414 may include the concha IR sensor and/or the tragus IR sensor. If the sensor(s) 414 are still detecting the body of the user 402 (804 YES), then the process 800 returns to act 804.

In some examples, a determination is made that the body of the user 402 is no longer being detected (804 NO) only if both the concha IR sensor and the tragus IR sensor are simultaneously not detecting the body of the user 402. In other examples, a determination is made that the body of the user 402 is no longer being detected (804 NO) if either of the concha IR sensor and the tragus IR sensor are not detecting the body of the user 402. In still other examples, other sensors may be implemented. If the sensor(s) 414 are not still detecting the body of the user 402 (804 NO), then the process 800 continues to act 806.

At act 806, a determination is made as to whether a time-out condition has been satisfied. In some examples, a determination that the wireless audio device 404 is no longer in use is only made if the sensor(s) 414 are no longer detecting the body of the user 402 (804 NO) for a threshold period of time (for example, 1000 ms). If the time-out condition has not been satisfied (806 NO), then the process 800 returns to act 804. If the time-out condition has been satisfied (806 YES), then the process 800 continues to act 808.

At act 808, a determination is made that the wireless audio device 404 is no longer in use. The determination that the wireless audio device 404 is no longer in use is based on the determination that the sensor(s) 414 have not detected the body of the user 402 for a threshold period of time, consistent with the user 402 having disengaged the wireless audio device 404 from the body of the user 402.

At act 810, the process 800 ends.

Figure 9:
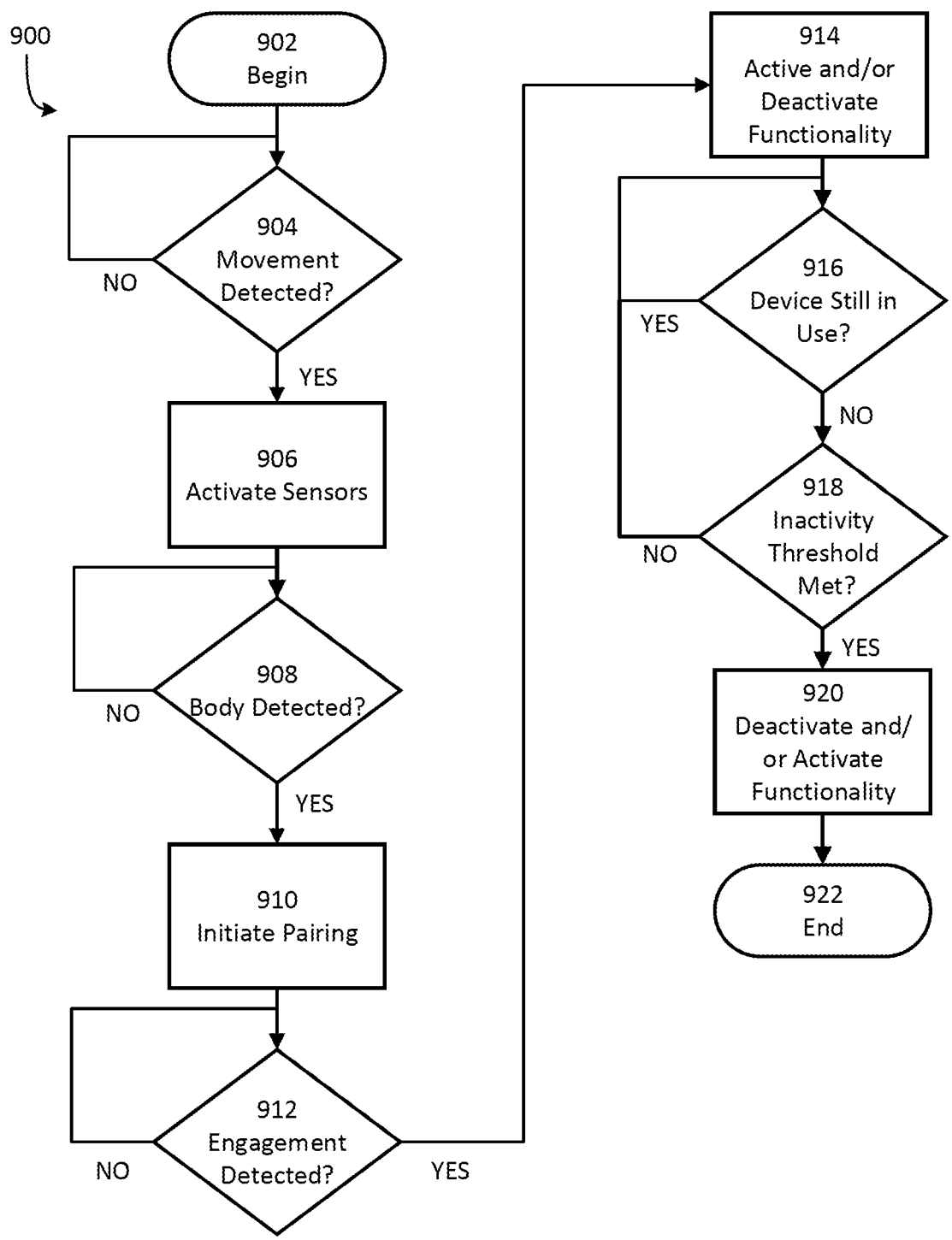
FIG. 9 illustrates a process of operating a wireless audio device according to an example.

Other examples of operating the wireless audio device 404 may be provided. For example, FIG. 9 illustrates a process 900 of operating the wireless audio device 404 according to another example. The process 900 may initially be executed while the wireless audio device 404 is in a low-power mode during which certain functionality is disabled or suspended and other functionality is enabled. For example, a wireless bond with the audio source 406 may be disabled, and one or more of the sensor(s) 414 may be in an off or low-power state, but one or more feedforward compressors may be activated.

At act 902, the process 900 begins.

At act 904, a determination is made by the wireless audio device 404 as to whether the wireless audio device 404 is being moved. For example, movement of the wireless audio device 404 may be caused by a user picking up the wireless audio device 404 because the user is preparing to use the wireless audio device 404. As discussed above, the sensor(s) 414 may include one or more accelerometers, gyroscopes, magnetometers, IMUs, or other sensors capable of determining movement of the wireless audio device. The controller(s) 412 may therefore determine, based on information received from the sensor(s) 414, whether or not the wireless audio device 404 is being moved.

If the wireless audio device 404 determines that the wireless audio device 404 is not being moved (904 NO), then the process 900 returns to act 904. The wireless audio device 404 may repeatedly execute act 904 (for example, continuously, periodically, aperiodically, and so forth) until movement is detected. If movement is detected (904 YES), then the process 900 continues to act 906.

At act 906, the wireless audio device 404 activates one or more of the sensor(s) 414. One or more of the sensor(s) 414 may be in a deactivated or low-power state while the wireless audio device 404 is in a low-power mode. For example, and as discussed above, the sensor(s) 414 may include one or more IR sensors configured to detect one or both of a user's concha and a user's tragus at least in part by detecting IR radiation reflecting from the user's concha and/or tragus. In various examples, a concha IR sensor and a tragus IR sensor may be configured to be in a deactivated or low-power state while the wireless audio device 404 is in a low-power mode. For example, in the deactivated or low-power state, the concha IR sensor and the tragus IR sensor may not be actively sensing IR electromagnetic radiation or may be sampling data at a reduced frequency, such that power consumption is minimized. Accordingly, in some examples of act 906, the wireless audio device 404 activates the concha IR sensor and the tragus IR sensor such that the concha IR sensor and the tragus IR sensor resume sensing IR electromagnetic radiation at a normal sampling frequency.

At act 908, a determination is made as to whether a user's body has been detected. For example, the wireless audio device 404 may determine if parts of the user's ear or head have been detected, which may indicate that the user is in the process of donning the wireless audio device 404. The determination may be made by the controller(s) 412 based at least in part on information received from the sensor(s) 414.

For example, where the sensor(s) 414 include a concha IR sensor and a tragus IR sensor, the controller(s) 412 may determine, based on information received from the concha IR sensor and the tragus IR sensor, whether the information received from the concha IR sensor and the tragus IR sensor indicates that the wireless audio device 404 is proximate to the user's concha and tragus. In some examples, a user's body is not determined to be detected unless both the user's concha and tragus are detected approximately simultaneously. In other examples, a user's body may be determined to be detected where either the user's concha and tragus are detected, including examples in which only one of the concha or tragus sensor is implemented and examples in which both of the concha and tragus sensors are implemented.

In other examples, the sensor(s) 414 may include one or more sensors to determine the presence or absence of other parts of the user's body, such as other parts of a user's ear, a user's head, or other parts of the user's body. If the wireless audio device 404 determines, based on information received from the sensor(s) 414, that a user's body has not been detected (908 NO), then the process 900 returns to act 908. Act 908 may be repeatedly executed until a user's body has been detected (908 YES), at which point the process 900 continues to act 910.

At act 910, a pairing process is initiated. The determination that a user's body is detected at act 908 may grant the wireless audio device 404 a low confidence that a user is preparing to use the wireless audio device 404, at least because it is relatively unlikely that the wireless audio device 404 would be brought near the parts of the user's body detected by the wireless audio device 404 unless the user were preparing to use the wireless audio device 404. Accordingly, at act 910, the wireless audio device 404 may initiate a pairing process with an audio source, such as the audio source 406.

At act 912, a determination is made as to whether an engagement between the wireless audio device 404 and a user's body is detected. For example, engagement between the wireless audio device 404 and the user's body may include a situation in which the wireless audio device 404 has been donned by the user, and the user is no longer touching the wireless audio device 404. Such a situation may indicate that the user 402 has adjusted the wireless audio device 404 to a comfortable position and is ready to use the wireless audio device 404.

Accordingly, act 912 may include first determining if a user is still touching the wireless audio device 404. For example, the sensor(s) 414 may include a thermal or capacitive touch sensor configured to determine if a user is touching the wireless audio device 404. If the controller(s) 412 determines, based on information received from the sensor(s) 414, that the user is still touching the wireless audio device 404 (912 NO), then the process 900 returns to act 912.

If the user 402 is not still touching the wireless audio device 404, then a determination may be made as to whether movement of the wireless audio device 404 preceding the user releasing the wireless audio device 404 is indicative of the user donning the wireless audio device 404. For example, in examples in which the wireless audio device 404 is an in-ear device, movement indicative of the user donning the wireless audio device 404 may include the wireless audio device 404 moving inwards into the user's ear.

Accordingly, the wireless audio device 404 may analyze information received from one or more of an accelerometer, gyroscope, magnetometers, or IMU, for example, to determine movement of the wireless audio device 404. Information received from the example sensor(s) may be buffered over a certain period of time (for example, 30 seconds), such that previously acquired movement or position data may be analyzed responsive to a condition being met. For example, the buffered movement or position information may be analyzed responsive to the wireless audio device 404 determining that the user is no longer touching the wireless audio device 404.

The determination that the user is not still touching the wireless audio device 404 and that the wireless audio device 404 was moved in a manner consistent with the wireless audio device 404 being donned preceding the release of the wireless audio device 404 may grant the wireless audio device 404 a high confidence that the user is preparing to use the wireless audio device 404. Accordingly, if the wireless audio device 404 determines that the user is not still touching the wireless audio device 404 and that the wireless audio device 404 was moved in a manner consistent with the wireless audio device 404 being donned preceding the release of the wireless audio device 404, then the wireless audio device 404 may determine that the wireless audio device 404 is fully engaged with a user's body (912 YES) and continue to act 914. Otherwise, if the wireless audio device 404 determines that the user is still touching the wireless audio device 404 or that the wireless audio device 404 was not moved in a manner consistent with the wireless audio device 404 being donned preceding the release of the wireless audio device 404, then the wireless audio device 404 may determine that the wireless audio device 404 is not fully engaged with the user's body (912 NO), and return to act 912.

At act 914, the wireless audio device 404 enters an active mode from the low-power mode. As discussed above, the active mode may include activating a full range of functionality of the wireless audio device 404, such as by awakening or ramping up operation of all or most of the sensor(s) 414. Although the active mode may consume more power than the low-power mode, the active mode may provide enhanced functionality to the user 402 from the wireless audio device 404. Act 914 may further include disabling certain functions, such as disabling one or more feedforward compressors.

For example, in addition to or in lieu of examples of functionality that may be executed discussed above, entering the active mode may include providing an in-ear audio signal (for example, by the wireless audio device 404 outputting a tone to the user 402 indicating that the wireless audio device 404 is in an active mode), providing an informative audio signal (for example, by the wireless audio device 404 outputting audible information indicative of a remaining energy level of the wireless audio device 404), answering a phone call (for example, if the wireless audio device 404 includes a mobile communication device), outputting audio (for example, by the wireless audio device 404 resuming outputting a song if the song was previously paused), enabling one or more capacitive touch sensors (for example, where the sensor[s] 414 include one or more capacitive touch sensors and the wireless audio device 404 is configured to receive capacitive touch inputs), modifying ANR or ANC functionality as discussed above, enabling voice-input functionality (for example, by activating one or more microphones to receive voice input signals, where the sensor[s] 414 include one or more microphones, or by enabling software configured to respond to voice inputs, such as by activating a virtual assistant configured to respond to user voice inputs or enabling the virtual assistant to wake up responsive to detecting a wake-up-word), increasing power to processing and/or RF functionality, adjusting a state of output components (for example, by modifying a state of a light-emitting component, such as a light-emitting diode, responsive to the wireless audio device 404 being fully engaged with a user's body, such as by turning the light-emitting component, turning the light-emitting component off, or altering a wavelength of light output by the light-emitting component), enabling master-puppet switching functionality (for example, where the wireless audio device 404 is one component of a pair of components having a master-puppet relationship to be used by a user, and it is desirable to switch which of the components is a master and which is a puppet), and so forth.

By the time act 914 is executed, the pairing process initiated at act 910 may be complete or nearly complete, and a wireless bond may be established with the audio source 406. With the wireless bond being established, and the wireless audio device 404 entering the active mode, the wireless audio device 404 may be fully ready for use by the user 402.

In various examples, one or more optional, user-configured actions may be executed at act 914. For example, an optional action may include commanding the audio source 406 to provide audio information to the wireless audio device 404, such as by commanding the audio source 406 to play music or to accept a telephone call. In some examples, the wireless audio device 404 may be configured to command the audio source 406 to play music from a designated music streaming service at act 914. In another example, the user 402 may control the wireless audio device 404 such that no optional actions are executed at act 914 except for entering the active mode.

It is to be appreciated that acts 902-614 may be executed to facilitate power savings and enhance a user's experience by expediting a wireless pairing process. Once the wireless bond is established, the user may freely use the wireless audio device 404. However, it may be desirable for the wireless audio device 404 to periodically determine if the wireless audio device 404 is still in use and, if not, to enter the low-power mode.

Accordingly, at act 916, a determination is made as to whether the wireless audio device 404 is still in use. The process 800 may be included in an example of the act 916. The controller(s) 412 executes the determination based on information received from the sensor(s) 414. For example, in examples in which the sensor(s) 414 include one or more IR sensors configured to detect portions of a user's head or ears, such as concha and/or tragus sensors, the controller(s) 412 may determine that the wireless audio device 404 is not still in use where none of the one or more IR sensors are detecting portions of the user's head or ears. In other examples, IR sensors may be implemented to detect other portions of a user's head or ears. In still other examples, the sensor(s) 414 may include other types of sensors, such as touch sensors and/or thermal sensors, to determine whether the wireless audio device 404 is still engaged with a user's head or ears.

If the wireless audio device 404 is no longer engaged with the user's body, as indicated by the lack of detection of portions of the user's head or ears, then the wireless audio device 404 may determine that the wireless audio device 404 is no longer in use by the user 402 (916 NO) and the process 900 continues to act 918. Otherwise, if the wireless audio device 404 determines that the wireless audio device 404 is still in use (916 YES), then the process 900 returns to act 916.

At act 918, a determination is made as to whether an inactivity threshold has been met. For example, the controller(s) 412 may determine an amount of time that has elapsed since the wireless audio device 404 was last determined, at act 916, to be in use, and determine if that amount of time has met or exceeded the inactivity threshold. For example, the inactivity threshold may be five minutes, ten minutes, 30 minutes, or any other period of time. If the inactivity threshold has not been met (918 NO), then the process 900 returns to act 916. Otherwise, if the inactivity threshold has been met (918 YES), then the process 900 continues to act 920.

At act 920, certain features are deactivated and/or activated. As discussed above, the process 900 may begin at act 902 with the wireless audio device 404 being in the low-power mode. Accordingly, certain features and/or components of the wireless audio device 404 may be curtailed, disabled, and/or powered down in the low-power mode. For example, the wireless bond discussed above with respect to act 910 may be disabled. In another example, one or more of the sensor(s) 414 may be powered down, disabled, or otherwise modified to conserve power (for example, by reducing a sampling frequency of the sensor[s] 414). Other features, such as a feedforward compressor, may be activated at act 918. In various examples, features that are activated or deactivated at act 920 may be user-configurable.

At act 920, the process 900 ends.

Accordingly, the processes 600-900 may be executed by the wireless audio device 404 to maximize user experience and minimize power consumption. It is to be appreciated that, in the context of the process 900, the wireless audio device 404 may be implemented in connection with any of several example devices including headphones, earphones, audio eyeglasses, and so forth. Furthermore, it is to be appreciated that various modifications to the process 900 are within the scope of the disclosure.

For example, in some examples of the process 600, one or more of the sensor(s) 414 used in detecting whether the wireless audio device 404 is in use at act 604 may be in a low-power mode, and may be activated responsive to detecting movement of the wireless audio device 404 as discussed above with respect to acts 904-906. Similarly, in various examples of the process 700, act 912 may be executed in addition to, or in lieu of, act 706.

As discussed above with respect to act 904, a first indication that the user 402 may be preparing to use the wireless audio device 404 may be movement of the wireless audio device 404. In other examples, other conditions may indicate that the user 402 is preparing to use the wireless audio device 404. For example, the sensor(s) 414 may include one or more sensors configured to detect a user touching the wireless audio device 404, such as a thermal sensor configured to detect changes in temperature resulting from a user's body heat or a capacitive touch sensor configured to detect changes in capacitance resulting from a user's proximity. In other examples, the sensor(s) 414 may include any other sensor capable of detecting a user's touch or proximity, or movement of the wireless audio device 404.

As discussed above with respect to acts 704 and 908, a body of the user 402 may be detected by one or more of the sensor(s) 414, such as a first IR sensor configured to detect a tragus of the user 402 and/or a second IR sensor configured to detect a concha of the user 402. In other examples, only one of the tragus IR sensor and the concha IR sensor may be implemented. In still other examples, other types of sensors may be implemented in connection with the sensor(s) 414 to detect a body of the user 402. For example, the sensor(s) 414 may include one or more IR sensors configured to detect other parts of the body of the user 402, such as the pinna or head of the user 402. Such IR sensors may be particularly advantageous where the wireless audio device 404 is configured to be coupled on or near an ear of the user 402, such as where the wireless audio device 404 is implemented in a configuration similar to the headphones 100.

In another example, the sensor(s) 414 may include alternate types of sensors, such as one or more strain gauges. For example, where the wireless audio device 404 is implemented in a configuration similar to the headphones 100, a strain gauge may be implemented in a connector similar to the connector 106. The strain gauge may detect strain data that is indicative of the wireless audio device 404 being coupled around a head of the user 402, at least because more strain may be placed on the connector than when the wireless audio device 404 is not expanded to couple around the head of the user 402. In still other examples, the sensor(s) 414 may include any other sensors configured to detect the presence or absence of certain portions of the body of the user 402.

As discussed above with respect to acts 606, 610, 914, and 920, the user 402 may customize whether and which actions are executed at the respective acts. Similarly, the user 402 may customize actions that are performed responsive to the body of the user 402 being detected at act 908. Actions performed responsive to the body of the user 402 being detected at act 908 may correspond to actions performed at act 914. For example, as discussed above, the user 402 may customize operation of the wireless audio device 404 such that music is played from a music streaming platform at act 914. Accordingly, a music streaming platform application corresponding to the music streaming platform discussed above may be launched responsive to a body of the user 402 being detected at act 908 to expedite the process of playing music at act 914. In other examples, the user 402 may customize operation of the wireless audio device 404 such that any other desired action is performed responsive to the body of the user 402 being detected at act 908.

In some examples, alternate or additional conditions may be required to be satisfied at act 908 prior to a determination being made that the body of the user 402 has been detected. For example, the sensor(s) 414 may include one or more orientation sensors configured to determine if the wireless audio device 404 is in a valid or invalid orientation. An invalid orientation may correspond to an orientation in which the wireless audio device 404 is not expected to be in use with the body of the user 402. For example, if the orientation indicates that the wireless audio device 404 is upside down, the wireless audio device 404 may determine that it is unlikely that the user 402 is attempting to use the wireless audio device 404 while upside down, and responsively determine that the body of the user 402 has not been detected (908 NO). In other examples, other orientations may be considered invalid. The wireless audio device 404 may determine if a valid or invalid orientation of the wireless audio device 404 is detected in addition to, or in lieu of, other actions (for example, determining if a concha IR sensor and/or tragus IR sensor detect parts of the body of the user 402) discussed above at act 908. Similarly, act 912 may include a determination as to the validity or invalidity of the orientation of the wireless audio device 404 in addition to or in lieu of the actions discussed above with respect to act 912.

As discussed above with respect to act 912, a determination as to whether the wireless audio device 404 has been fully engaged with a body of the user 402 may be based on the user 402 releasing the wireless audio device 404, and based on movement of the wireless audio device 404 being consistent with the user 402 donning the wireless audio device 404. For example, a determination of the user 402 holding or releasing the wireless audio device 404 may be based on data received from one or more of the sensor(s) 414, such as a capacitive touch sensor, a thermal sensor to detect body heat from the user 402, and so forth.

Furthermore, the determination of the movement of the wireless audio device 404 being consistent with the user 402 donning the wireless audio device 404 may be based on data received from one or more of the sensor(s) 414, such as an accelerometer, gyroscope, magnetometer, IMU, and so forth. The determination of the movement of the wireless audio device 404 being consistent with the user 402 donning the wireless audio device 404 may vary based on an implementation of the wireless audio device 404. For example, a movement indicative of the user 402 donning the wireless audio device 404 may differ where the wireless audio device 404 is implemented in a configuration similar to the headphones 100 as compared to examples in which the wireless audio device 404 is implemented in an audio eyeglass configuration.

In some examples, the wireless audio device 404 may communicate with one or more other wireless audio devices to determine whether movement is indicative of the user 402 donning the wireless audio device 404. For example, where the wireless audio device 404 is implemented in a configuration similar to the earpiece 300, which is one of a pair of earpieces, the wireless audio device 404 may communicate with the other earpiece of the pair of earpieces to which the earpiece 300 belongs. The wireless audio device 404 may communicate with the other earpiece to determine if, for example, the wireless audio device 404 and the other earpiece were moved towards one another, which may indicate that the user 402 donned the wireless audio device 404 by inserting the wireless audio device 404 and the other earpiece into the ears of the user 402.

In various examples, the wireless audio device 404 may detect engagement between the wireless audio device 404 and a body of the user 402 at act 912 using information and/or sensors alternate to, or in addition to, the information and sensors discussed above with respect to act 912. For example, in examples in which the wireless audio device 404 is implemented with a configuration similar to the headphones 100, the sensor(s) 414 may include one or more strain gauges to determine whether the user 402 has donned the wireless audio device.

More particularly, in various examples, the strain gauge information may be analyzed to identify an increased strain on the connector (corresponding, for example, to the user 402 pulling apart housings similar to the first housing 102 and the second housing 104 to fit the wireless audio device 404 over the head of the user 402) followed by a decreased strain on the connector (corresponding, for example, to the user 402 fitting the housings over ears of the user 402). For example, strain gauge information may be buffered and analyzed responsive to a condition being met, such as a determination that the user 402 has released the wireless audio device 404, which may be executed in addition to or in lieu of analyzing buffered movement or position information as discussed above with respect to act 912. In other examples, any other information and/or sensors may be implemented in addition to, or in lieu of, those discussed above with respect to act 912.

As discussed above with respect to acts 608-610 and 916-920, certain functionality of the wireless audio device 404 may be disabled responsive to determining that the wireless audio device 404 is no longer in use. In some examples, such as examples in which the wireless audio device 404 is one of a pair of devices (for example, one earbud in a pair of truly wireless earbuds), a determination to disable certain functionality may be made with respect to information received from the other device of the pair of devices. For example, where the wireless audio device 404 is implemented in a configuration similar to the earpiece 300, which is one of a pair of earpieces, the wireless audio device 404 may communicate with the other earpiece of the pair of earpieces to which the earpiece 300 belongs.

More particularly, the wireless audio device 404 may determine that functionality will not be disabled unless both devices of the pair of earpieces are no longer in use. Thus, the user 402 may stop using the wireless audio device 404 for at least the inactivity threshold but continue to use the other device of the pair of devices, and the wireless audio device 404 may remain active until the other device is also no longer in use. In other examples, the wireless audio device 404 may execute acts 608-610 and 916-920 without regard to any other devices. In still other examples, the user 402 may configure whether the wireless audio device 404 executes acts 608-610 and 916-920 with respect to other devices.

As discussed above, devices disclosed herein may be controlled by controllers including the controller(s) 412. Using data stored in associated memory, the controllers may execute one or more instructions stored on one or more non-transitory computer-readable media that may result in manipulated data. In some examples, the controllers may include one or more processors or other types of controllers. In another example, the controllers include a field-programmable gate array controller.

In yet another example, the controllers perform a portion of the functions disclosed herein on a processor and performs another portion using an application-specific integrated circuit tailored to perform particular operations. As illustrated by these examples, examples in accordance with the present invention may perform the operations described herein using many specific combinations of hardware and software and the invention is not limited to any particular combination of hardware and software components.

Having thus described several aspects of at least one example, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An audio device comprising:
   at least one of an accelerometer, gyroscope, magnetometer, or inertial measurement unit (IMU);
   one or more infrared (IR) sensors; and
   a controller configured to
      in response to entering a low-power mode during which certain functionality is disabled or suspended, determine whether the audio device is being moved using the at least one of an accelerometer, gyroscope, magnetometer, or IMU;
      in response to determining that the audio device is being moved when in the low-power mode, bring the one or more IR sensors out of a deactivated or low-power state; and
      in response to determining the audio device is engaged with a user's body using at least the one or more IR sensors, activate additional functionality of the audio device.

2. The audio device of claim 1, wherein the additional functionality includes providing an audio signal to i) indicate the audio device is in an active mode and/or ii) provide information about the audio device.

3. The audio device of claim 1, wherein the additional functionality includes answering a phone call.

4. The audio device of claim 1, wherein the additional functionality includes resuming audio output that was previously paused.

5. The audio device of claim 1, wherein the additional functionality includes enabling one or more capacitive touch sensors.

6. The audio device of claim 1, wherein the additional functionality includes modifying active noise reduction functionality.

7. The audio device of claim 1, wherein the additional functionality includes enabling voice-input functionality.

8. The audio device of claim 1, wherein the additional functionality includes increasing power to processing and/or radio frequency (RF) functionality.

9. The audio device of claim 1, wherein the additional functionality includes enabling master-puppet switching functionality.

10. The audio device of claim 1, wherein the controller is further configured to, in response to determining i) the audio device is no longer engaged with the user's body using at least the one or more IR sensors and ii) an inactivity threshold has been met, cause the audio device to re-enter the low-power mode.

11. A method of operating an audio device, the method comprising:
   in response to the audio device entering a low-power mode during which certain functionality of the audio device is disabled or suspended, determine whether the audio device is being moved using at least one of an accelerometer, gyroscope, magnetometer, or inertial measurement unit (IMU) of the audio device;
   in response to determining that the audio device is being moved when in the low-power mode, bring one or more infrared (IR) sensors of the audio device out of a deactivated or low-power state; and
   in response to determining the audio device is engaged with a user's body using at least the one or more IR sensors, activate additional functionality of the audio device.

12. The method of claim 11, wherein the additional functionality includes providing an audio signal to i) indicate the audio device is in an active mode and/or ii) provide information about the audio device.

13. The method of claim 11, wherein the additional functionality includes answering a phone call.

14. The method of claim 11, wherein the additional functionality includes resuming audio output that was previously paused.

15. The method of claim 11, wherein the additional functionality includes enabling one or more capacitive touch sensors.

16. The method of claim 11, wherein the additional functionality includes modifying active noise reduction functionality.

17. The method of claim 11, wherein the additional functionality includes enabling voice-input functionality.

18. The method of claim 11, wherein the additional functionality includes increasing power to processing and/or radio frequency (RF) functionality.

19. The method of claim 11, wherein the additional functionality includes enabling master-puppet switching functionality.

20. The method of claim 11, further comprising, in response to determining i) the audio device is no longer engaged with the user's body using at least the one or more IR sensors and ii) an inactivity threshold has been met, cause the audio device to re-enter the low-power mode.

* * * * *